United States Patent
Tredoux et al.

(10) Patent No.: US 9,854,148 B2
(45) Date of Patent: Dec. 26, 2017

(54) MICRO-LOCATION OF DEVICES WITHIN A WIRELESS NETWORK USING ROOM BOUNDARY IMAGES

(71) Applicant: Xerox Corporation, Norwalk, CT (US)

(72) Inventors: Gavan Leonard Tredoux, Penfield, NY (US); Premkumar Rajendran, Fairport, NY (US); Peter J. Zehler, Penfield, NY (US); Raja Bala, Pittsford, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 170 days.

(21) Appl. No.: 14/817,299

(22) Filed: Aug. 4, 2015

(65) Prior Publication Data
US 2017/0039445 A1 Feb. 9, 2017

(51) Int. Cl.
*G06K 9/00* (2006.01)
*H04N 5/232* (2006.01)
*G01S 5/00* (2006.01)

(52) U.S. Cl.
CPC ....... *H04N 5/23206* (2013.01); *G01S 5/0009* (2013.01); *G06K 9/00664* (2013.01); *H04N 5/23254* (2013.01)

(58) Field of Classification Search
None
See application file for complete search history.

(56) References Cited

U.S. PATENT DOCUMENTS

| | | | | |
|---|---|---|---|---|
| 8,483,715 | B2* | 7/2013 | Chen | G06F 17/30247 348/207.1 |
| 8,605,189 | B2* | 12/2013 | Fan | G06K 9/2081 348/135 |
| 9,536,152 | B2* | 1/2017 | Li | G06K 9/00771 |
| 2014/0081870 | A1* | 3/2014 | de Sylva | G06Q 20/40145 705/44 |
| 2017/0039445 | A1* | 2/2017 | Tredoux | G06K 9/4671 |

* cited by examiner

*Primary Examiner* — Tahmina Ansari
(74) *Attorney, Agent, or Firm* — Fox Rothschild LLP (57) ABSTRACT

In a system for detecting location of an object inside of a building, an image capture device of a mobile electronic device captures an image of a boundary of a room in which the portable electronic device is positioned. The system extracts features of a boundary (ceiling, wall or floor) in the image to determine whether the mobile device is in a known location. When the system identifies a known location, it will take an action that provides the portable electronic device with additional functionality at the identified known location. Such functionality may include connecting to a wireless network or communicating with a stationary device at the known location.

24 Claims, 3 Drawing Sheets

MICRO-LOCATION OF DEVICES WITHIN A WIRELESS NETWORK USING ROOM BOUNDARY IMAGES

BACKGROUND

Many systems exist for detecting the location of an object. The most prominent example is the Global Positioning System (GPS). However, existing systems often lack an ability to detect the location of an object that is inside of a building. Or, the resolution obtained may not be fine enough for the purpose at hand. For example, GPS technologies cannot precisely pinpoint the location of an object within a building, such as by room or other micro-location. Other systems, such as near field communication (NFC) systems and short-range communication systems such as Bluetooth® tags, are known but require additional deployment steps and administrative overhead.

This document describes methods and devices that are directed to solving at least some of the issues described above.

SUMMARY

In an embodiment, a system for determining a location of an object inside of a building includes a portable electronic device having a positional sensor and an image capture device. The system also includes processor and a non-transitory computer-readable memory device containing programming instructions that are configured to instruct the processor to perform the determination. The processor and memory device may be components of the portable electronic device, or one or both of these items may be separate elements that are in communication with the portable device.

The system is configured to cause the image capture device to capture an image of a boundary of a room in which the portable electronic device is positioned, receive the image captured by the image capture device, and process the image to extract one or more features of the boundary in the image. The system will then access a data set of micro-location data that includes parameters for boundaries and, for each boundary, an associated micro-location. The system will compare the extracted features with parameters in the data set to identify a micro-location of the boundary in the image. When the system identifies a known micro-location of the boundary in the image, it will take an action that provides the portable electronic device with additional functionality at the identified known micro-location.

In some embodiments, if the system identifies more than one candidate micro-location, it may determine whether a non-positional sensor of the portable electronic device has received data that corresponds to any of the candidate micro-locations. If so, it may select as the known micro-location the candidate micro-location for which the non-positional sensor received corresponding data.

As an example of such an action, the system may provide the processor with an identifier, a security credential or both for a network to which a proximate stationary electronic device is connected, so that the portable device may connect to the network. The portable electronic device may include an antenna, and the action that provides the portable electronic device with additional functionality may include automatically causing the portable electronic device to connect to the network via the antenna and communicate with the proximate stationary electronic device.

In some embodiments, the proximate stationary electronic device may be a printer device. If so, then optionally if the system automatically causes the portable electronic device to communicate with the printer device, the system may cause the portable electronic device to transfer an electronic document file to the printer device for printing a document on a substrate.

In some embodiments, before causing the portable electronic device to communicate with the proximate stationary electronic device, the system's image capture device may receive an image of the proximate stationary electronic device. The system may process the image of the proximate stationary electronic device, extract features of the stationary electronic device and use the extracted features to identify the stationary electronic device.

In some embodiments, the portable electronic device may output an instruction that will inform a user how to place the portable electronic device proximate a stationary electronic device in a location that corresponds to an image capture position. This may occur in response to the system determining, based on the received positional sensor data, that the portable electronic device is not in an image capture position.

When the processor determines, based on the received positional sensor data, that the portable electronic device is in an image capture position, it may initiate the processing of the images to extract one or more features and the comparing of extracted features with parameters in the data set.

In an alternate embodiment, a system includes a mobile electronic device having a processor, an image capture device, and a non-transitory computer-readable memory with programming instructions. The system detects the location of a stationary electronic device at a micro-location and initiates communication with the stationary device by receiving a request to communicate with the stationary device and determining whether the mobile electronic device is in an image capture position. When the mobile electronic device is in the image capture position, the system captures an image of a boundary of a micro-location within which the mobile electronic device and the stationary electronic device are located. The system analyzes the captured image and compares the captured image to a data set of known image data to select a known stationary electronic device. Each item of known image data is associated with a known stationary electronic device and a known micro-location. The system then uses the identified known stationary electronic device to implement the request of the mobile electronic device to communicate with the stationary electronic device.

Optionally, in the alternate embodiment the system will automatically cause the mobile electronic device to transfer an electronic document file to the selected known stationary electronic device. Optionally, before causing the mobile electronic device to communicate with the stationary electronic device, the image capture device may receive an image of the proximate stationary electronic device; and the system may extract features of the stationary electronic device and use the extracted features to identify the selected known stationary electronic device. As another option, the system may receive positional sensor data from a positional sensor of the mobile electronic device, compare the received positional sensor data to positional sensor parameters that correspond to the image capture position to determine whether the mobile electronic device is in the image capture position, and if the mobile electronic device is not in the image capture position then output an instruction that will inform a user how to place the mobile electronic device in the image capture position. As another option, if the system identifies more than one candidate micro-location, it may determine whether a non-positional sensor of the mobile electronic device has received data that corresponds to any of the candidate micro-locations, and it may select as the known micro-location the candidate micro-location for which the non-positional sensor received corresponding data.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. Also, in this document the term "comprising" means "including, but not limited to."

In this document, the term "connect" and its variants mean either a physical connection or a non-physical connection via which two devices may share data and/or instructions via signals sent via a wired or wireless communication protocol.

In this document, the term "image capture device" means a device capable of optically viewing an object and converting an interpretation of that object into electronic signals. One such example of an imaging device is a camera, and this document may use the term "camera" as shorthand to refer to any type of image capture device.

In this document, the term "micro-location" refers to the physical location of an object within a building component. A building component is a room, hallway, corridor, atrium, closet, or other location within a building or other artifact of construction that is definable by boundaries that include walls and a ceiling.

In this document, the terms "mobile electronic device," "mobile device" and "portable electronic device" are interchangeably used and mean an electronic device that includes a processor and a non-transitory, computer-readable medium, and which is configured to be portable. Examples of portable electronic devices include smartphones, personal digital assistants, cameras, tablet devices, electronic readers, laptop computers, media players, satellite navigation devices and the like.

In this document, the term "printer device" means an electronic device that is configured to print on a substrate based on data received in digital format. A printer device may be a component of a multi-functional device in which at least one of the functions is printing on a substrate.

In this document, the term "positional sensor" means a sensor or system of sensors that is (or are) a hardware component of a mobile electronic device and which is (or are) configured to capture data relating to the position and/or movement of the mobile electronic device. Examples of positional sensors include accelerometers and gyroscopes. A "non-positional sensor" is any sensor or system of sensors other than the positional sensor, such as an audio sensor (i.e., a microphone), an image sensor (i.e., an image capture device), or a sensor that detects a physical user input such as a keypad sensor or a touchscreen sensor.

In this document, the term "stationary electronic device" means an electronic device that includes a processor and a non-transitory, computer-readable medium, and which is generally configured to remain in a single location and not typically carried from place to place by a user. Examples of stationary electronic devices include desktop computers; servers; office equipment such as printers and multifunctional devices; and the like.

Figure 1:
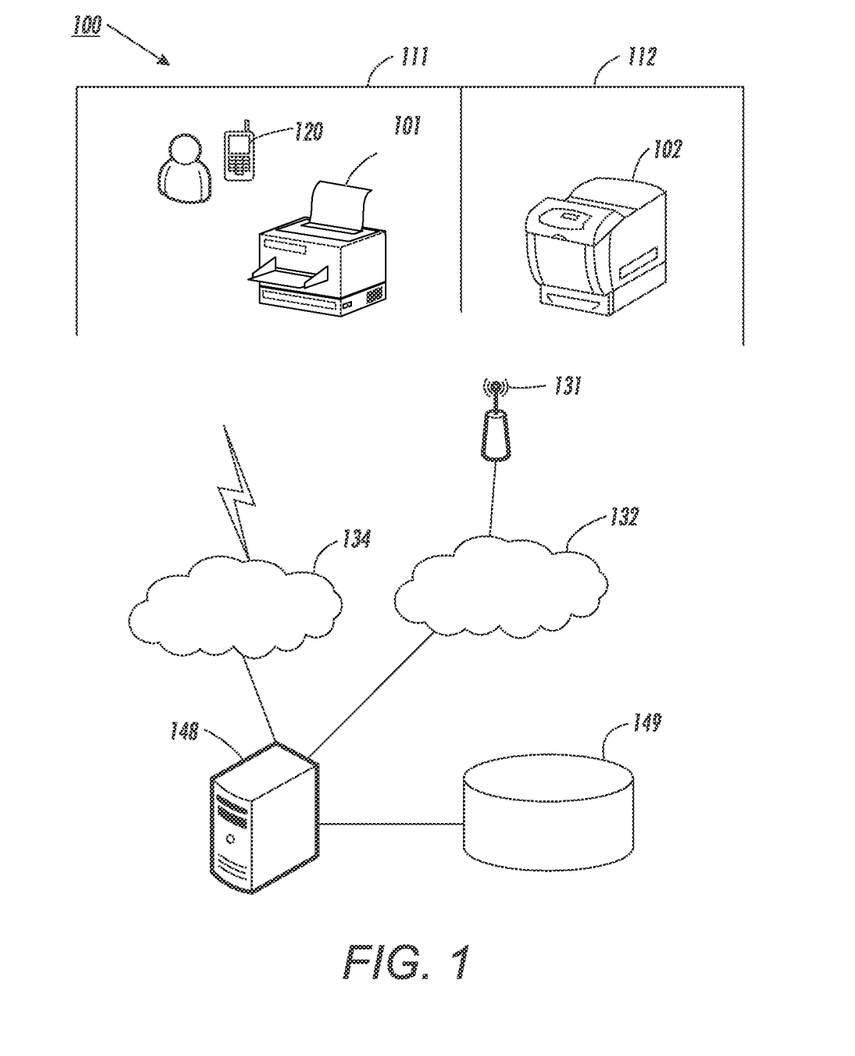
FIG. 1 illustrates various components of a system for detecting the location of an object within a building.

FIG. 1 illustrates various components of a system 100 for detecting a micro-location of a stationary electronic device and causing a proximate mobile device to take actions that are appropriate for the location. The system 100 includes any number of stationary electronic devices 101, 102 that are positioned in various micro-locations 111, 112. A person walking in the area may carry a mobile electronic device 120 that can be positioned on or near any of the stationary electronic devices 101, 102. The mobile and stationary electronic devices are connected to a local communication network 132 that is available via a wireless access point 113. The wireless access point enables the electronic devices to connect to a network 132. Other devices, such as a server or other computing device 148 and a data storage facility (data store) 149, may be available to some or all of the electronic devices via the local network 132 or a separate network 134 such as a cellular data network.

In the systems described in this document, a mobile electronic device may determine its micro-location by using an image of a boundary that is captured by the mobile electronic device's camera. A user will place the mobile device in an image capture position, which may be indicated by a marking (such as a label, sticker, engraving or button) on a housing of a stationary electronic device. A processor (which may be the processor within the mobile device, a remote processor that receives data from the mobile device such as the server 148 of FIG. 1, or a combination of the two) will receive positional data from one or more positional sensors within the mobile device to determine whether the device is properly positioned. When the device is properly positioned, the device's image capture device will capture an image of the micro-location's boundary, and it will process the image to compare the image features with parameters of known ceilings or walls for micro-locations that are stored in a data storage facility. Optionally, the system may be trained through use to determine additional micro-locations.

The system may use the micro-location to provide the mobile device with additional functionality. Examples of additional functionality include connecting to a wireless network that is available at the micro-location, or pairing to a stationary electronic device (such as a printer device) and transferring data to the stationary device (such as a document file to be printed by the printer device).

Figure 2:
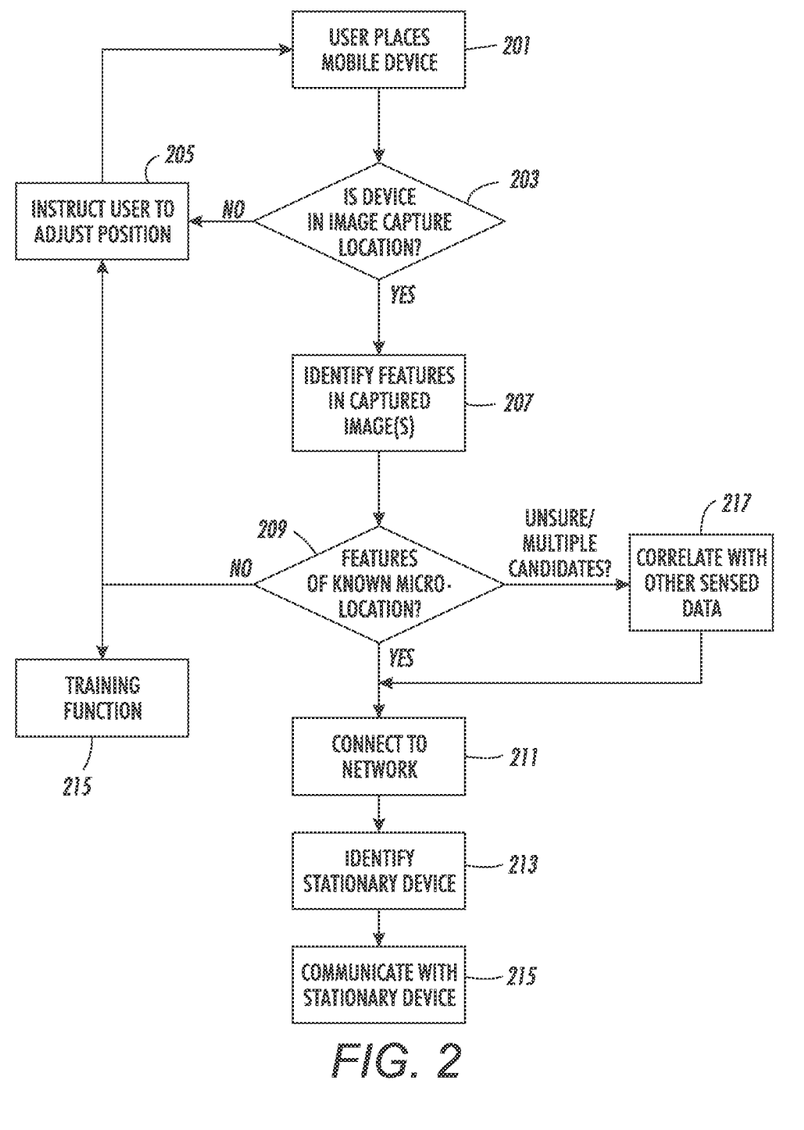
FIG. 2 is a flowchart that illustrates a process for detecting the location of an object within a building.

FIG. 2 illustrates an example of how a system may implement a micro-location detection process. A mobile electronic device will initiate the process by any suitable start action, such as launching an application on the device, a user executing a command available via an application of the mobile device, or the detection of a device location by a sensor. A user will place the mobile device 201 in a location that corresponds to an image capture location, such as a spot on the housing of a stationary electronic device.

Using data from positional sensors contained with the electronic device, the system will determine whether the positional data indicates that the device is properly oriented and in the image capture location 203. To determine whether the device is properly oriented, the system may receive positional sensor data from the positional sensor, and it will compare the received positional sensor data to expected positional sensor parameters (such as angle of orientation) that will correspond to an image capture position. The expected parameters will be stored in a memory, and the system may require that the received data and expected parameters exactly match, or that the received data be within a range of expected parameters. The system may store a common set of expected parameters for all locations, or the system may require the user to provide certain data about the mobile device's location, and if so it will retrieve from a memory parameters that are stored for that location. The positional sensor data may be, for example, data from a gyroscope and/or accelerometer that will indicate an angle of orientation of the mobile device and its camera.

Optionally, the system also may process images received by the device's camera to determine whether the images contain features that correspond to parameters of a known image capture position. This comparison process will be described in more detail below.

The proper orientation will correspond to a location at which the mobile device will capture an image of a ceiling or wall of the micro-location. In generally, ceilings are more likely to be used since the device can capture an image of the ceiling without needing to worry about obstacles that may be in the way (such as the user, who may obstruct a wall). However, the system includes embodiments in which the system will capture a ceiling, wall or floor of the micro-location, and this document will use the term "boundary" to refer to any such element (ceiling, floor or wall) of the location.

If the system determines, based on the received positional sensor data (and optionally the image data), that the portable electronic device is not properly oriented and in the image capture position, it will output an instruction 205 that will inform a user how to place the mobile device proximate a stationary electronic device in a location that corresponds to an image capture position, and it will repeat the process until the system determines that the mobile device is properly oriented in the image capture position. The system may inform the user of proper placement using text and/or images on a display of the mobile device, audible prompts via a speaker of the mobile device, or by haptic feedback such as a vibration when the device is properly positioned (or when it is not properly positioned).

When the processor determines, based on the received positional sensor data, that the portable electronic device is properly oriented and in the image capture position 203, it will then capture an image of a boundary of the micro-location, and it will initiate the processing of images captured by the device to extract one or more features from the images 207. Features are extracted so as to facilitate image classification or retrieval and matching tasks. Extracted features may be appearance-based, and can include color, texture, shape and edge descriptors. Alternatively, extracted features may be statistical or data-driven in nature, and may include features derived from principal component analysis (PCA), singular value decomposition (SVD), and neural network analysis.

In one embodiment, each possible micro-location is associated with an image class, and the micro-location determination is formulated as an image classification task. To this end, one or more images of each micro-location may be acquired and features extracted from the images in order to obtain a feature representation of each of the acquired images. A statistical classifier may then be trained on the resulting feature space in order to learn the boundaries that separate the different image classes and their associated micro-locations. As an image of a boundary of the micro-location is acquired for localization purposes, the same set of features used at training is extracted from the acquired image in order to effectively compute the representation of the newly acquired image in the image space on which the classifier was trained. The classifier is then applied to the computed feature representation in order to determine the image class to which the acquired image belongs, thus effectively determining a micro-location associated with the acquired image.

In another embodiment, one or more images are acquired of each micro-location, and the micro-location determination is formulated as a content-based image matching and retrieval task. To this end, one or more reference images of each micro-location may be acquired and features extracted from the reference images in order to obtain a feature representation of each of the acquired images. As an image of a boundary of the micro-location is acquired for localization purposes, the same set of features extracted from the reference images is extracted from the acquired image, and the feature representation of the newly acquired image is compared to those of all reference images. The micro-location corresponding to the reference image whose feature representation most closely matches the feature representation of the acquired image may be determined to be the micro-location corresponding to the acquired image.

In yet another embodiment, different image matching techniques may be used to match features of a candidate image with parameters of one or more known images in the system's data store. For example, techniques as the "perceptive hash" or "radial hash" algorithms may be used. In some embodiments, the system may use hashing techniques that are robust to common distortions (e.g., rotation, lighting, etc.) while yet being discriminative across different micro-locations. The invention is not limited to any of these techniques, but any such techniques may be optimized for this specific application, by taking into account the distinctive boundary features identified above.

The system will then access a data set of known micro-location features and determine whether the features in the image match the parameters of any known micro-location in the data set 209. Example features and their corresponding parameters include: (i) texture of ceiling tiles in hung ceilings, which contain distinctive patterns (e.g., stippling and grain); (ii) the pattern of cross-girders identified by edge detection; (iii) general paint and other color variation and patterning on the boundary; (iv) the position of light fixtures on the boundary; (iv) the position of fire hydrant sprinklers on the boundary; (v) the position of a Wi-Fi router that is visible in the image; (vi) random variation in buckling patterns exhibited by the ceiling tiles or other boundary components, detectable at the edges where the tiles join the girders and cast distinctive shadows; (vii) distinctive shadows caused by the interaction of light sources in the area, such as other lights not directly visible; and (viii) the positions of unique features such as stains that occur due to moisture.

If the system identifies multiple candidate micro-locations based on the extracted image features, or if the system does not have data to identify a known micro-location with at least a threshold degree of confidence, in some embodiments it may determine whether any other sensors of the mobile device have received data that corresponds to any of the candidate micro-locations 217. Such parameters may be, for example: (i) whether a wireless network sensor of the mobile device has received a wireless router identifier that matches that of a router that is known in any of the candidate micro-locations; (ii) whether an audio input sensor the mobile device detects a sound having an audible signature that a known audible signature of a micro-location; or (iii) the generation of a prompt for user input via a user interface (e.g., touch screen, keypad, or audio input sensor) for information that will help the system identify the micro-location, such as details about other features of the location or a selection of a candidate micro-location itself from a menu of candidate locations.

In some embodiments, before or after capturing the image of the boundary, the system may prompt the user to cause the mobile device to capture an image of the stationary electronic device. The system may process the image to extract one or more features of the stationary device (such as its shape, user interface hardware positions, data on its label, and the like) and compare the extracted features to a set of known stationary device data in order to identify the stationary electronic device 213. The system may then: (i) use this data as a feature that will help the system select a micro-location from multiple candidate micro-locations (as described above); (ii) use this data to help select which of several possible stationary electronic devices at the location will be connected to the mobile electronic device; or (iii) simply to provide a confirmation of the identification of the stationary electronic device before the system takes the action that is appropriate for the device.

If the system cannot determine that the mobile device is in a known micro-location 209, it may again cause the mobile device to output (via a display and/or audio output) an instruction for the user to reposition the device 205. After a threshold number of failed matching attempts, the system may simply return a message indicating that it cannot identify a known micro-location.

However, if the system does identify that the features of the image match parameters (and optionally other sensed data) of the known micro-location 209, it may provide the device with additional functionality that relates to the known micro-location. For example, the system may provide the mobile device with a network identifier and/or security code that the device can use to access a local network to which the stationary electronic device is connected, such as a Wi-Fi network that is available via a wireless access point as shown in FIG. 1 so that the mobile device can connect to the network 211. In addition, when this network connection occurs, the system may cause the mobile device to communicate with the stationary device 215. For example, if the stationary device is a printer device, the system may cause the mobile electronic device to transfer an electronic document file to the printer device for printing a document on a substrate.

To determine whether features of a captured image match parameters of a known micro-location, in an embodiment the system may use a binary classifier that outputs a binary decision of whether the captured image belongs to a known micro-location. For example, the classifier may use color features (e.g., three-dimensional 3×3×3 color histograms) and texture features (e.g., local binary patterns, 256×1 histograms of texture values), and determine whether the data corresponds to data for known micro-locations as captured in previous images.

Optionally, the system may include a training function 215 in which the mobile device will capture an image of a location. The system will then ask the user to enter data identifying the micro-location and one or more stationary electronic devices that are in the micro-location. The system may store this information in its data store for use in the future when mobile devices are used to capture images at the micro-location. The training function may be available as a command on the application running on a mobile device, or it may be launched automatically if the system is unable to identify the micro-location. After the user identifies the information as part of the training process, if the system can then identify the micro-location as a known micro-location based on the user input, it may provide the mobile device with the additional functionality, and it may update its data set by replacing the previous data with the new data (or including the new data with the previous data).

In some embodiments, when attempting to determine a micro-location of the mobile device, the system may use additional parameters other than just those extracted from the captured image. For example, the system also may use:

(1) Gross location information obtained from the last known GPS or assisted GPS reading from the mobile device, which may be accurate to the building level or better, depending on obstructions.

(2) The unique identifier (e.g., BSSID) of the wireless router to which the mobile is connected. The BSSID is a globally unique identifier (GUID) that is specific to the access point (as opposed to the SSID, which has much broader scope). This could be used, for example, at the reception area of a single access point, e.g. a region of a floor in a building.

(3) The wireless signal strength of the access point currently connected to and any other wireless access points currently visible, if these strengths are known and available.

(4) Further image matching based on images obtained from a second camera that faces the opposite direction (i.e., rear-facing vs. front-facing) on the mobile device. The second camera may capture an image of the stationary electronic device as the mobile device is moved toward the stationary device. Using one of more of the last good images before the device obscures the view, and matching a database of known images in a similar manner to the boundary image taken by the device's first camera. These images would be close-ups of the stationary device itself and contain characteristic features that depend on the model assembly, housing, texture shape and so on.

(5) Other wireless signals, such as Bluetooth low energy transmissions, currently visible to the mobile device.

Data points such as those described above may be additional factors that may be combined using any now or hereafter known multivariate statistical techniques for classifying objects probabilistically, such as multinomial logistic regression, linear discriminant analysis, random forest decision trees, nearest-neighbor classification, or other techniques.

In the event that even with additional disambiguation there are still multiple possible micro-locations, the system may cause a user interface of the mobile device to output more than one candidate locations to the user, and it may prompt the user to select one of the candidate locations. In this way the set of possible locations has at least been narrowed down.

In addition, the matching information obtained above may also be used to merely supply an order to multiple candidate locations, rated by probability of being the correct match. In an optional step, once it has been verified that the correct micro-location has been identified, the user-captured image may be added to the training database. This way, the location classifier continues to incrementally learn based on newly acquired labels.

The system may use machine learning techniques to build up the database of known images and other information required to make micro-location matches. This may be assisted by, but does not require, an administrator who establishes a set of images for each location by placing the mobile on the designated spot on the stationary device at multiple orientations and acquiring the relevant image, while manually supplying location information (such as the device IP address) once to make the required association. In an alternative embodiment, the database creation application can take a few images captured by the administrator, and synthesize from these a large set of training images corresponding to the specific micro-location by applying distortions to the original captured images that model common variations in capture conditions. Distortions could include geometric transformations (rotations, perspective, etc.), and photometric transformations (brightness/contrast variations to simulate different levels of ambient lighting, etc.) Alternatively, as users use the system from scratch, they are prompted by supply configuration information themselves until the system has made enough associations to assist them, with information shared among users of the system, which is thus trained by active use.

Figure 3:
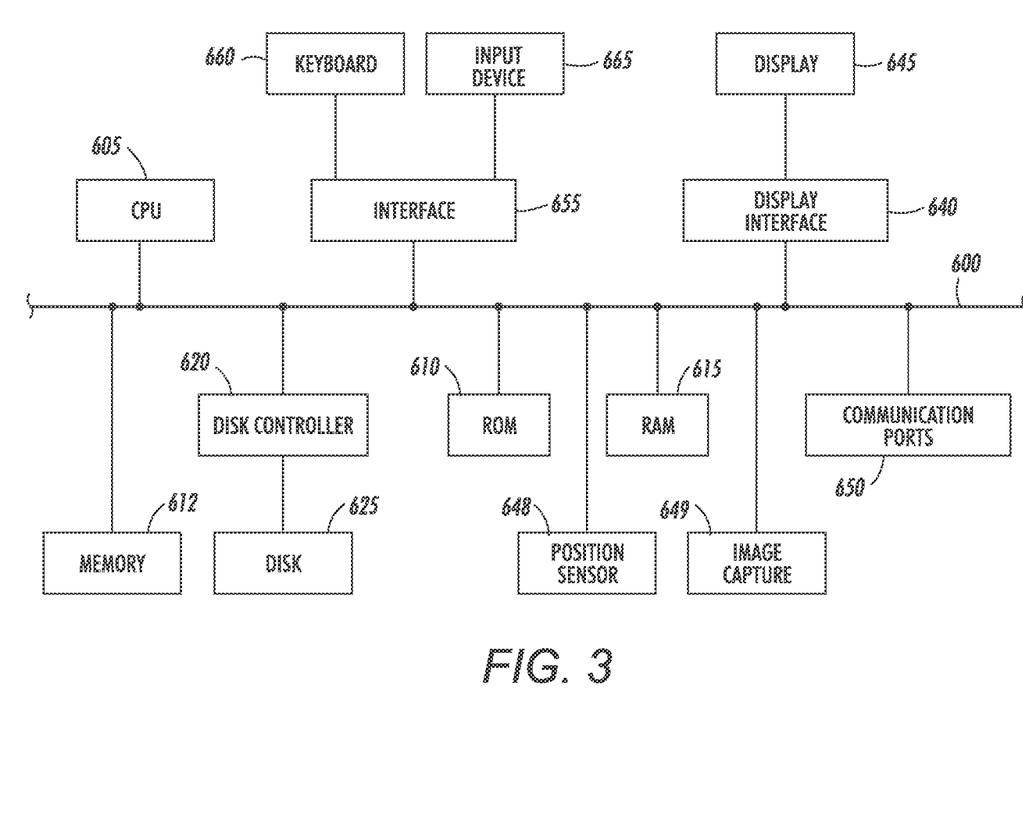
FIG. 3 illustrates various components that may be included in an electronic device.

FIG. 3 depicts a block diagram of an example of internal hardware that may be used to contain or implement program instructions, such as the process steps discussed above, according to embodiments. Any or all of the hardware shown in FIG. 3 may be components of the mobile electronic device, remote server, and/or print devices of the various embodiments disclosed in this document. A bus 600 serves as a data communication path interconnecting the other illustrated components of the hardware. CPU 605 represents one or more processors of the system, performing calculations and logic operations required to execute a program. CPU 605, alone or in conjunction with one or more of the other elements disclosed in FIG. 3, is an example of a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 625 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, and/or other recording medium.

An optional display interface 640 may permit information from the bus 600 to be displayed on the display 645 in audio, visual, graphic or alphanumeric format. As described above, components of a mobile electronic device may include a positional sensor 648 and an image capture device 649 such as a camera.

Communication with external devices may occur using various communication ports 650. A communication port 650 may include a wireless connection device (such as an antenna) or wired components via which the device may communicatively connect to a communications network, such as the Internet or an intranet via an access point such as the wi-fi access point described above.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for determining a location of an object inside of a building, the system comprising:
   a portable electronic device comprising:
      a positional sensor, and
      an image capture device,
   a processor; and
   a non-transitory computer-readable memory device containing programming instructions that are configured to instruct the processor to:
      cause the image capture device to capture an image of a boundary of a building component in which the portable electronic device is positioned, wherein the boundary comprises a wall or ceiling,
      receive the image captured by the image capture device,
      process the image to extract one or more features of the boundary in the image,
      access a data set of micro-location data, wherein the micro-location data comprises parameters for boundaries and, for each boundary, an associated micro-location,
      compare the extracted features with parameters in the data set to identify a micro-location of the boundary in the image, and
      when the processor identifies a known micro-location of the boundary in the image, take an action that provides the portable electronic device with additional functionality at the identified known micro-location.

2. The system of claim 1, wherein the action that provides the portable electronic device with additional functionality comprises providing the processor with an identifier for a network to which a proximate stationary electronic device is connected.

3. The system of claim 2, wherein the action that provides the portable electronic device with additional functionality comprises providing the processor with a security credential for the network.

4. The system of claim 2, wherein:
   the portable electronic device also comprises an antenna; and
   the action that provides the portable electronic device with additional functionality also comprises automatically causing the portable electronic device to connect to the network via the antenna and communicate with the proximate stationary electronic device.

5. The system of claim 4, wherein:
   the proximate stationary electronic device is a printer device; and
   automatically causing the portable electronic device to communicate with the printer device comprises causing the portable electronic device to transfer an electronic document file to the printer device for printing a document on a substrate.

6. The system of claim 4, further comprising additional programming instructions that are configured to instruct the processor to, before causing the portable electronic device to communicate with the proximate stationary electronic device:
  receive, via the image capture device, an image of the proximate stationary electronic device; and
  process the image of the proximate stationary electronic device to extract features of the stationary electronic device and use the extracted features to identify the stationary electronic device.

7. The system of claim 2, further comprising additional programming instructions that are configured to instruct the processor to cause the portable electronic device to output an instruction that will inform a user how to place the portable electronic device proximate a stationary electronic device in a location that corresponds to an image capture position.

8. The system of claim 1, further comprising additional programming instructions that are configured to instruct the processor to:
  receive positional sensor data from the positional sensor;
  compare the received positional sensor data to positional sensor parameters that correspond to an image capture position;
  when the processor determines, based on the received positional sensor data, that the portable electronic device is not in an image capture position, output an instruction that will inform a user how to place the portable electronic device proximate a stationary electronic device in a location that corresponds to an image capture position; and
  when the processor determines, based on the received positional sensor data, that the portable electronic device is in an image capture position, initiate the processing of the image to extract the one or more features and compare the extracted features with parameters in the data set.

9. The system of claim 1, wherein the processor and the computer-readable memory device are components of the portable electronic device.

10. The system of claim 1, further comprising additional programming instructions that are configured to instruct the processor to:
  if the processor identifies more than one candidate micro-location, determine whether a non-positional sensor of the portable electronic device has received data that corresponds to any of the candidate micro-locations; and
  select as the known micro-location the candidate micro-location for which the non-positional sensor received corresponding data.

11. A method of detecting location of a stationary object at a micro-location and initiating communication with the object, the method comprising:
  operating a portable electronic device comprising an image capture device and a processor to:
    cause the image capture device to capture an image of a boundary of a micro-location of a building component in which the portable electronic device is positioned,
    receive the image captured by the image capture device,
    process the image to extract one or more features of the boundary of the building component in the image,
    access a data set of micro-location data, wherein the micro-location data comprises parameters for boundaries of micro-locations and, for each boundary, an associated micro-location,
    compare the extracted features with parameters in the data set to identify a micro-location of the boundary of the building component in the image, and
    when the processor identifies a known micro-location of the boundary of the building component in the image, take an action that provides the portable electronic device with additional functionality at the identified known micro-location.

12. The method of claim 11, wherein the action that provides the portable electronic device with additional functionality comprises providing the portable electronic device with an identifier for a network to which a proximate stationary electronic device is connected.

13. The method of claim 12, wherein the action that provides the portable electronic device with additional functionality also comprises providing the portable electronic device with a security credential for the network.

14. The method of claim 12, wherein:
  the action that provides the portable electronic device with additional functionality also comprises automatically causing the portable electronic device to connect to the network via an antenna and communicate with the proximate stationary electronic device.

15. The method of claim 14, wherein:
  the proximate stationary electronic device is a printer device; and
  automatically causing the portable electronic device to communicate with the printer device comprises causing the portable electronic device to transfer an electronic document file to the printer device for printing a document on a substrate.

16. The method of claim 14, further comprising, before causing the portable electronic device to communicate with the proximate stationary electronic device:
  receiving, via the image capture device, an image of the proximate stationary electronic device;
  processing the image of the proximate stationary electronic device to extract features of the proximate stationary electronic device; and
  using the extracted features to identify the stationary electronic device.

17. The method of claim 12, further comprising operating the portable electronic device to inform a user how to place the portable electronic device proximate a stationary electronic device in a location that corresponds to an image capture position.

18. The method of claim 11, further comprising:
  receiving positional sensor data from a positional sensor of the portable electronic device;
  comparing the received positional sensor data to positional sensor parameters that correspond to an image capture position;
  upon determining, based on the received positional sensor data, that the portable electronic device is not in an image capture position, outputting an instruction that will inform a user how to place the portable electronic device proximate a stationary electronic device in a location that corresponds to an image capture position; and
  upon determining, based on the received positional sensor data, that the portable electronic device is in an image capture position, initiating the processing of the image to extract the one or more features and the comparing of the extracted features with parameters in the data set.

19. The method of claim 11, further comprising, upon identifying more than one candidate micro-location:

determining whether a non-positional sensor of the portable electronic device has received data that corresponds to any of the candidate micro-locations; and selecting as the known micro-location the candidate micro-location for which the non-positional sensor received corresponding data.

20. A method of detecting location of a stationary electronic device and initiating communication with the stationary electronic device, the method comprising:

by a system including a mobile electronic device having a processor, an image capture device, and a non-transitory computer-readable memory, executing programming instructions that cause the processor to:

receive a request to communicate with a stationary electronic device, determine whether the mobile electronic device is in an image capture position, when the mobile electronic device is in the image capture position, capture an image of a boundary of a micro-location within which the mobile electronic device and the stationary electronic device are located, analyze the captured image and compare the captured image to a data set of known image data, wherein each item of known image data is associated with a known micro-location, to select a known micro-location, use the known micro-location to identify a stationary electronic device that is associated with the known micro-location, and use the selected known stationary electronic device to implement the request of the mobile electronic device to communicate.

21. The method of claim 20, further comprising automatically causing the mobile electronic device to transfer an electronic document file to the selected known stationary electronic device.

22. The method of claim 20, further comprising, before causing the mobile electronic device to communicate with the selected known stationary electronic device:

by the image capture device, receiving an image of the selected known stationary electronic device; and executing additional programming instructions that cause the processor to process the image of the selected known stationary electronic device to extract features of the selected known stationary electronic device and use the extracted features to identify the selected known stationary electronic device.

23. The method of claim 20, further comprising, by the processor:

receiving positional sensor data from a positional sensor of the mobile electronic device;

comparing the received positional sensor data to positional sensor parameters that correspond to the image capture position to determine whether the mobile electronic device is in the image capture position; and if the mobile electronic device is not in the image capture position, outputting an instruction that will inform a user how to place the mobile electronic device in the image capture position.

24. The method of claim 20, further comprising:

identifying more than one candidate micro-location;

determining whether a non-positional sensor of the mobile electronic device has received data that corresponds to any of the candidate micro-locations; and selecting as the known micro-location the candidate micro-location for which the non-positional sensor received corresponding data.

* * * * *